United States Patent
Kus et al.

(10) Patent No.: US 10,527,122 B2
(45) Date of Patent: Jan. 7, 2020

(54) HYDRAULIC DAMPER WITH A HYDRAULIC COMPRESSION STOP ARRANGEMENT

(71) Applicant: BeijingWest Industries Co., Ltd., Beijing (CN)

(72) Inventors: Pawel Edward Kus, Cracow (PL); Piotr Andrzej Flacht, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/856,322

(22) Filed: Dec. 28, 2017

(65) Prior Publication Data

US 2018/0223942 A1    Aug. 9, 2018

Related U.S. Application Data

(60) Provisional application No. 62/454,094, filed on Feb. 3, 2017.

(51) Int. Cl.
*F16F 9/516*    (2006.01)
*F16F 9/49*     (2006.01)
(Continued)

(52) U.S. Cl.
CPC .............. *F16F 9/516* (2013.01); *F16F 9/165* (2013.01); *F16F 9/3465* (2013.01); *F16F 9/49* (2013.01);
(Continued)

(58) Field of Classification Search
CPC ...... F16F 9/49; F16F 9/48; F16F 9/165; F16F 9/516; F16F 9/3465; F16F 2230/42;
(Continued)

(56) References Cited

U.S. PATENT DOCUMENTS

| | | | |
|---|---|---|---|
| 2,783,859 A | 3/1957 | Patriquin | |
| 2,907,414 A | 10/1959 | Patriquin | |

(Continued)

FOREIGN PATENT DOCUMENTS

| | | | |
|---|---|---|---|
| CN | 101134488 A | 3/2008 | |
| CN | 107429774 A | 12/2017 | |

(Continued)

OTHER PUBLICATIONS

Extended Search Report dated Jul. 6, 2018 for counterpart European Application No. EP 18154364.6.

(Continued)

*Primary Examiner* — Robert A. Siconolfi
*Assistant Examiner* — San M Aung
(74) *Attorney, Agent, or Firm* — William H. Honaker; Dickinson Wright PLLC

(57) ABSTRACT

A hydraulic damper includes a hydraulic compression stop arrangement having an insert including a bottom and a fixing member including a body. The bottom is attached to the body through a locking connection preventing axial movement of the insert and transferring pressure exerted on the insert to the fixing member and allowing the cavity of the insert to receive the additional piston during the compression stroke to provide an additional damping force. The body includes a locking plate and the bottom includes a locking yoke with the locking yoke being secured to the locking plate to define the locking connection. The fixing member includes a head and the locking plate extends radially outwardly from the head defining a recess extending about the center axis. The locking yoke, having an arcuate shape and an L-shaped cross section, extends axially outwardly from the bottom to engage the recess forming the locking connection.

14 Claims, 5 Drawing Sheets

(51) Int. Cl.
 F16F 9/16 (2006.01)
 F16F 9/346 (2006.01)
 B60G 13/08 (2006.01)
 B60G 17/08 (2006.01)
(52) U.S. Cl.
 CPC .............. B60G 13/08 (2013.01); B60G 17/08 (2013.01); B60G 2202/24 (2013.01); B60G 2206/41 (2013.01); B60G 2500/10 (2013.01); B60G 2800/162 (2013.01); F16F 2228/066 (2013.01); F16F 2230/0082 (2013.01); F16F 2230/42 (2013.01)
(58) Field of Classification Search
 CPC . F16F 2228/066; B60G 13/08; B60G 15/068; B60G 2200/142; B60G 2202/24; B60G 2206/41; B60G 2500/10; B60G 2800/162
 USPC .......................................................... 188/281
 See application file for complete search history.

(56) References Cited

U.S. PATENT DOCUMENTS

| | | | | |
|---|---|---|---|---|
| 2,984,321 | A * | 5/1961 | Schultze | F16F 9/49 188/282.8 |
| 3,150,747 | A | 9/1964 | Bliven et al. | |
| 3,175,645 | A | 3/1965 | Schafer et al. | |
| 3,447,644 | A * | 6/1969 | Duckett | F16F 9/48 188/288 |
| 2002/0053493 | A1 | 5/2002 | Sintorn et al. | |
| 2008/0053765 | A1 * | 3/2008 | Tomonaga | B62K 25/08 188/315 |
| 2016/0223045 | A1 | 8/2016 | Baldoni et al. | |
| 2016/0230835 | A1 * | 8/2016 | Groves | B60G 3/06 |

FOREIGN PATENT DOCUMENTS

| | | |
|---|---|---|
| DE | 19829765 | 2/1999 |
| FR | 3004501 A1 | 10/2014 |
| JP | 2016003675 | 1/2016 |
| WO | 2016126776 | 8/2016 |
| WO | 2016127076 A1 | 8/2016 |
| WO | 2016146660 | 9/2016 |
| WO | 2016146660 A1 | 9/2016 |

OTHER PUBLICATIONS

First Office Action and search report dated May 14, 2019 for counterpart Chinese patent application No. 201810014747.0, along with machine EN translation downloaded from EPO.

* cited by examiner

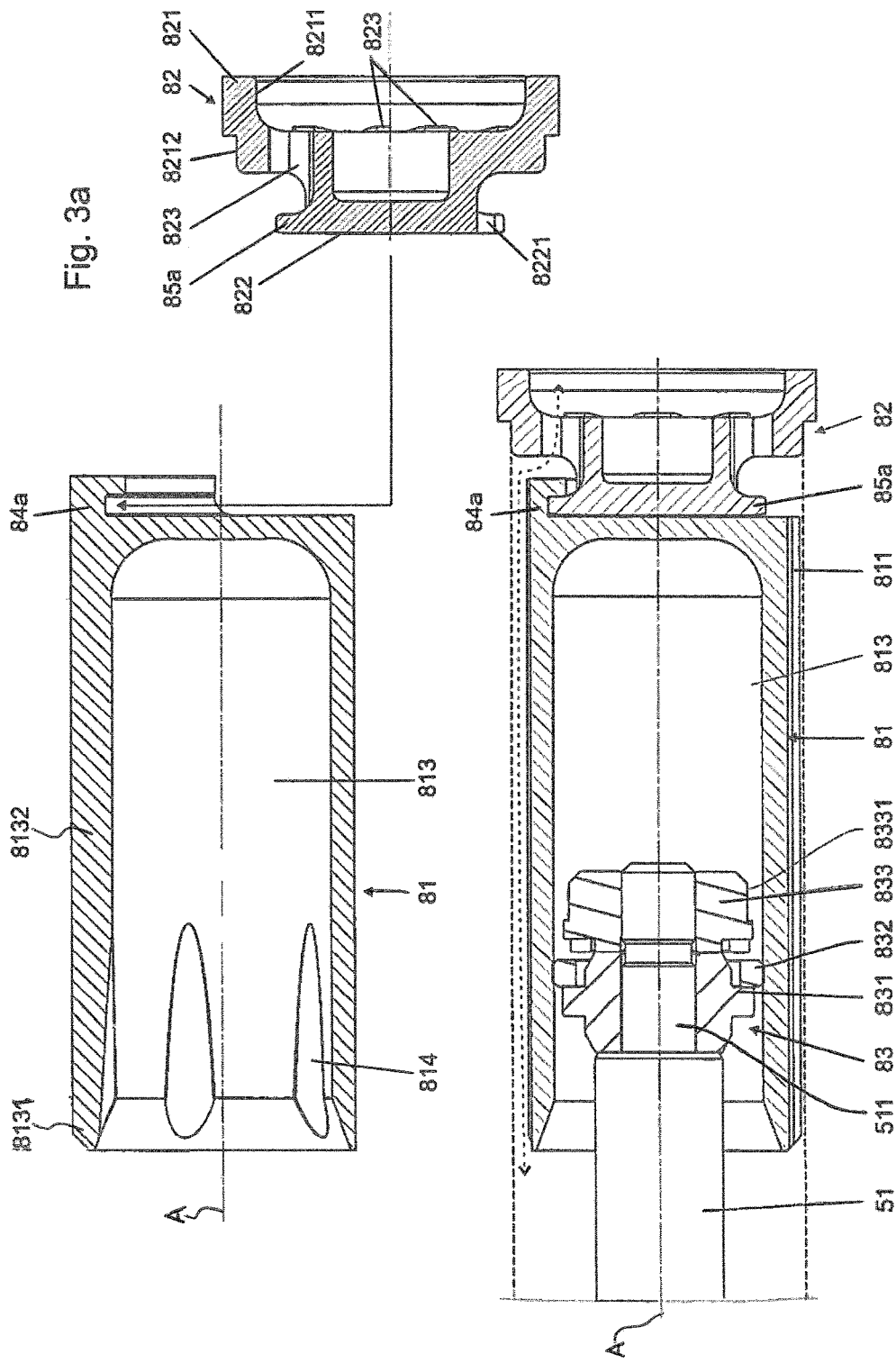

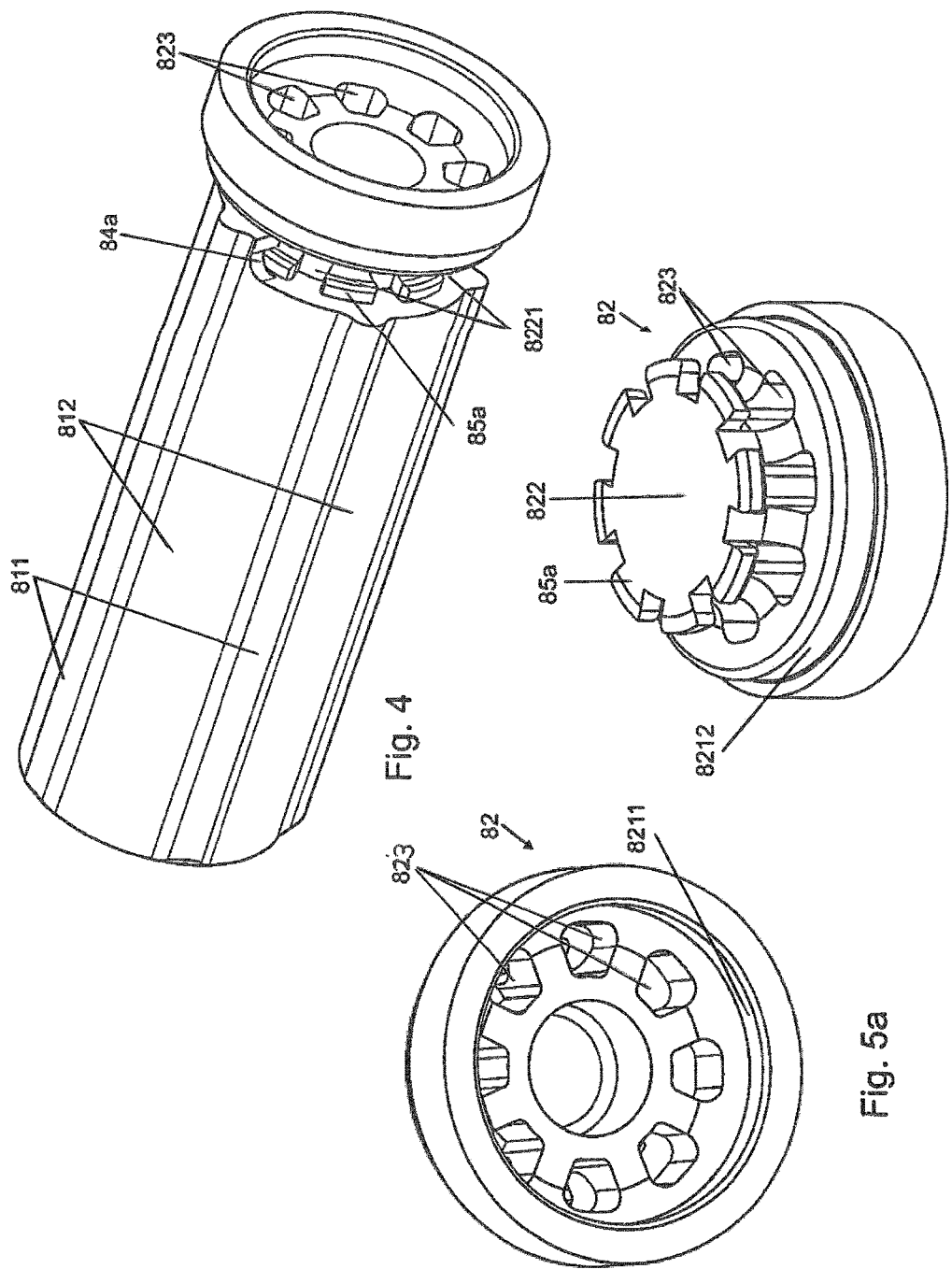

HYDRAULIC DAMPER WITH A HYDRAULIC COMPRESSION STOP ARRANGEMENT

CROSS REFERENCE TO RELATED APPLICATION

This application claims the benefit of Provisional Application Ser. No. 62/454,094 filed on Feb. 3, 2017, the entire disclosures of which is incorporated herein by reference.

BACKGROUND OF THE INVENTION

1. Field of the Invention

The present invention relates generally to a hydraulic damper assembly.

2. Description of the Prior Art

A hydraulic damper including a hydraulic compression stop arrangement generates an additional damping force over a predefined section of the piston rod as the piston rod travels during a compression stroke. Traditionally, a hydraulic damper assembly for a vehicle is provided with a first end stop member, which is arranged inside the hydraulic damper assembly and is configured to operate during the rebound stroke of the hydraulic damper assembly, and a second end stop member, which is arranged outside the shock-absorber and is configured to operate during the compression stroke of the hydraulic damper assembly. The end stop members may be of elastic or hydraulic type.

Such a hydraulic damper is disclosed in WO2016/146660. The hydraulic damper includes a main tube disposed on a center axis extending between a first end and a second end defining a fluid chamber extending along the center axis for containing a working fluid. A main piston is slidably disposed in the fluid chamber and movable along the center axis dividing the fluid chamber into a compression chamber between the first end and the main piston and a rebound chamber between the second end and the main piston. A piston rod guide is disposed in the rebound chamber and attached to the main tube to close the rebound chamber. A piston rod extends along the center axis through the piston rod guide and attached to the main piston for moving the main piston between a compression stroke and a rebound stroke. During the compression stroke, the main piston moves toward the first end. During the rebound stroke the main piston moves toward the second end and the piston rod guide. A piston rod extender is disposed in the compression chamber, attached to the piston rod, and extends along the center axis.

A hydraulic compression stop arrangement is disposed in the compression chamber attached to the first end for providing additional damping force for the hydraulic damper during the compression stroke. The hydraulic compression stop arrangement includes a fixing member having a body attached to the first end of the main tube. The hydraulic compression stop arrangement further includes an insert disposed in the compression chamber and spaced from the main tube. The insert has a bottom and an inner vessel including a cylindrical section disposed on the center axis and extending outwardly from the bottom to define a cavity in communication with the compression chamber. The hydraulic compression stop arrangement further includes an additional piston attached to the piston rod extender for movement with the piston rod during the compression stroke and rebound stroke.

SUMMARY OF THE INVENTION

The present invention in its broadest aspect allows for the transfer of pressure exerted on the insert to the fixing member thereby prolonging the life of the hydraulic compression stop arrangement. In addition, the present invention provides a simplified, low cost assembly where the hydraulic compression stop arrangement does not require substantial modifications of the components of the hydraulic damper and may be employed as an add-on in existing hydraulic damper designs. The present invention also provides an easy assembly of the hydraulic damper without any additional press fit or snap fit interfaces thereby greatly reduces the risk of contaminating the working liquid with any debris that might be generated while assembling the components of the hydraulic damper with each other. The present invention further provides reduced costs and improved production tolerances for the hydraulic damper.

The invention provides a hydraulic damper including a main tube disposed on a center axis extending between a first end and a second end defining a fluid chamber extending along the center axis for containing a working fluid. A main piston is slidably disposed in the fluid chamber and movable along the center axis dividing the fluid chamber into a compression chamber between the first end and the main piston and a rebound chamber between the second end and the main piston. A piston rod guide is disposed in the rebound chamber and attached to the main tube to close the rebound chamber. A piston rod extends along the center axis through the piston rod guide and attached to the main piston for moving the main piston between a compression stroke and a rebound stroke. During the compression stroke, the main piston moves toward the first end. During the rebound stroke the main piston moves toward the second end and the piston rod guide. A piston rod extender is disposed in the compression chamber, attached to the piston rod, and extends along the center axis.

A hydraulic compression stop arrangement is disposed in the compression chamber attached to the first end for providing additional damping force for the hydraulic damper during the compression stroke. The hydraulic compression stop arrangement includes a fixing member having a body attached to the first end of the main tube. The hydraulic compression stop arrangement further includes an insert disposed in the compression chamber and spaced from the main tube. The insert has a bottom and an inner vessel including a cylindrical section disposed on the center axis and extending outwardly from the bottom to define a cavity in communication with the compression chamber. The hydraulic compression stop arrangement further includes an additional piston attached to the piston rod extender for movement with the piston rod during the compression stroke and rebound stroke. The bottom of the insert is attached to the fixing member through a locking connection to prevent axial movement of the insert and transfer pressure exerted on the insert to the fixing member and allow the cavity of the insert to receive the additional piston during the compression stroke to provide the additional damping force during the compression stroke.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3a is a cross-sectional exploded view of the insert and the fixing member of the hydraulic compression stop arrangement, FIG. 3b is an enlarged fragmentary cross-sectional view the hydraulic compression stop arrangement, FIG. 4 is a perspective view of the insert and the fixing member of the hydraulic compression stop arrangement, FIG. 5a is a bottom perspective view of the fixing member of the hydraulic damper, FIG. 5b is a perspective view of the fixing member of the hydraulic damper.

DESCRIPTION OF THE ENABLING EMBODIMENT

Figure 1:
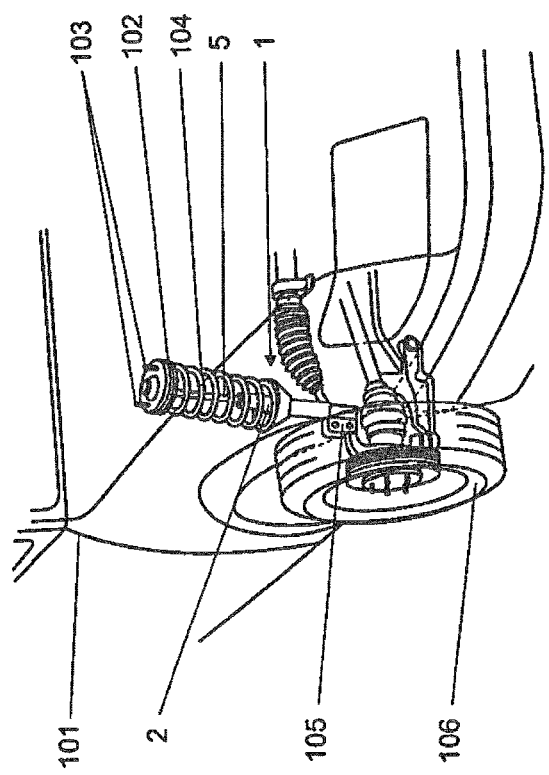
FIG. 1 is a fragmentary view of a vehicle suspension including the hydraulic damper of the present invention.
Figure 2:
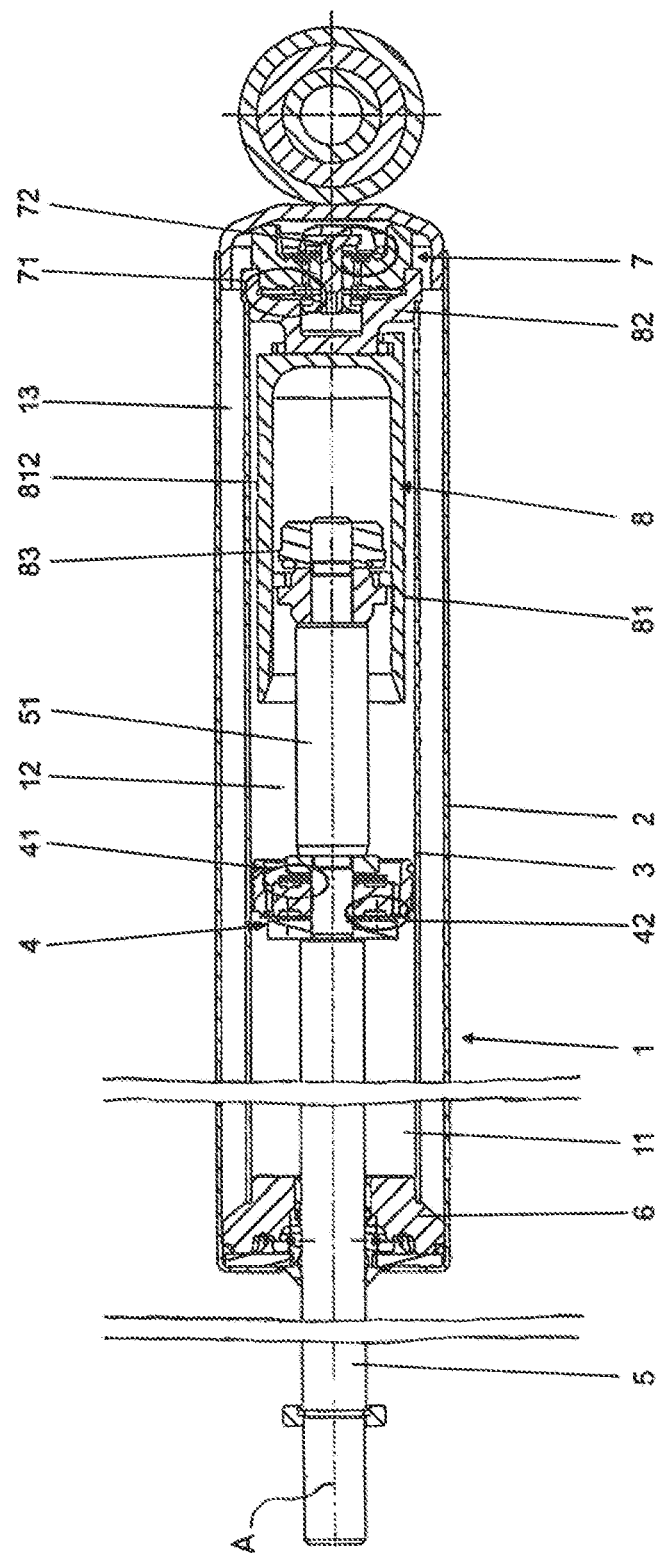
FIG. 2 is a cross-sectional perspective view of the hydraulic damper.

Referring to the Figures, wherein like numerals indicate corresponding parts throughout the several views, a hydraulic damper 1 in accordance with the present invention is generally shown in FIGS. 1 and 2.

FIG. 1 schematically illustrates a fragment of an exemplary vehicle suspension including the hydraulic damper 1 of the present invention attached to a vehicle chassis 101 via a top mount 102 and a number of screws 103 disposed on the periphery of the upper surface of the top mount 102. The top mount 102 is connected to a coil spring 104 and a piston rod 5 of the hydraulic damper 1. The external tube 2 of the hydraulic damper 1 is connected to the steering knuckle 105 supporting vehicle wheel.

The hydraulic damper 1 in accordance with the present invention is generally shown in FIG. 1. The hydraulic damper 1 includes a main tube 3 having a cylindrical shape disposed on a center axis A and extends annularly about the center axis A between a first end and a second end. The main tube 3 defines a fluid chamber extending along the center axis A between the first end and the second end for containing a working fluid. An external tube 2, having a generally cylindrical shape, is disposed on the center axis A, spaced from the main tube 3, and extends annularly about the center axis A between a closed end and an opened end. The external tube 2 defines a compensation chamber 13, between the main tube 3 and the external tube 2, extending annularly about the center axis A. The closed end of the external tube 2 is adjacent to the first end of the main tube 3 and the opened end is adjacent to the second end of the main tube 3. A cap is disposed at the first end of the main tube 3 and the closed end of the external tube 2 and attached to the closed end of the external tube 2 to close the fluid chamber and the compensation chamber 13. A mounting ring, having a generally circular shape, is disposed on the cap for attaching the hydraulic damper 1 to a vehicle. It should be appreciated that the present invention is not limited to a twin-tube type hydraulic damper 1, the present invention can also be used in connection with a single tube type hydraulic damper 1.

The hydraulic damper 1 includes a main piston 4, having a generally cylindrical shape, slidably disposed in the fluid chamber, movable along the center axis A, and abutting the main tube 3. The main piston 4 divides the fluid chamber into a compression chamber 12 and a rebound chamber 11. The compression chamber 12 extends between the main piston 4 and the closed end of the external tube 2. The rebound chamber 11 extends between the main piston 4 and the opened end of the external tube 2. A piston rod guide 6 is disposed in the rebound chamber 11 and adjacent to the second end of the main tube 3. The piston rod 5 is also disposed adjacent to the opened end of the external tube 2 and in sealing engagement with the main tube 3 and the external tube 2 to close the rebound chamber 11. The piston rod guide 6 includes a bore, having a generally cylindrical shape, extending along the center axis A and in communication with the rebound chamber 11. A piston rod 5, having a generally cylindrical shape, is disposed on the center axis A and extends along the center axis A, through the bore of the piston rod guide 6, into the rebound chamber 11 to a distal end. The main piston 4 is attached to the piston rod 5 at the distal end. The piston rod 5 moves the main piston 4 between a compression stroke and a rebound stroke. The compression stroke is defined as the main piston 4 moving toward the first end of the main tube 3 and the closed end of the external tube 2. The rebound stroke is defined as the main piston 4 moving toward the second end of the main tube 3 and the piston rod guide 6.

The main piston 4 has a compression surface and a rebound surface. The compression surface is disposed in the compression chamber 12 facing the cap. The rebound surface is disposed in the rebound chamber 11 facing the piston rod guide 6. The main piston 4 defines a plurality of passages including a set of inner passages and a set of outer passages with the set of inner passages being disposed radially spaced from the outer passages. In other words, the inner passages are disposed closer to the center axis A than the outer passages. The passages extend between the compression surface and the rebound surface and axially spaced from one another for allowing the working fluid to flow through the passages during the compression stroke and the rebound stroke. A first compression valve 42, having a plurality of discs with each of the discs having a generally circular shape, is disposed on the rebound surface of the main piston 4 and covering the outer passages for limiting the flow of the working fluid through the main piston 4 during the compression stroke to provide a damping force during the compression stroke. A first rebound valve 41, having a plurality of discs with each of the discs having a circular shape, is disposed on the compression surface of the main piston 4 and covering the inner passages for limiting the flow of the working fluid through the main piston 4 during the rebound stroke to provide a damping force during the rebound stroke.

A piston rod extender 51, having a generally cylindrical shape, is disposed on the center axis A and is attached to the distal end of the piston rod 5. The piston rod extender 51 extends along the center axis A to a compression end. A threaded projection 511, having a generally cylindrical shape, extends outwardly from the compression end of the piston rod 5.

A hydraulic compression stop arrangement 8 is disposed in the compression chamber 12 and attached to the first end of the main tube 3 for providing additional damping force during the compression stroke. The hydraulic compression stop arrangement 8 includes a fixing member 82, as best shown in FIGS. 5a and 5b, having a generally cylindrical shape, attached to the first end of the main tube 3. Preferably, the fixing member 82 is made from a metallic material, e.g. a sintered steel. The fixing member 82 includes a body 821, having a generally cylindrical shape, disposed on the center axis A in the compression chamber 12. The body 821 has an internal cylindrical surface 8211 and an external cylindrical surface 8212. The internal cylindrical surface 8211 extends annularly about the center axis A defining a pocket. The external cylindrical surface 8212 is spaced from the internal cylindrical surface 8211 and extends annularly about the center axis A and defines a shoulder for receiving the first end of the main tube 3. The body 821 defines at least one axial channel 823 extending through the body 821 and parallel to the center axis A and in fluid communication with the compression chamber 12 and the base valve 7. Preferably, the at least one axial channel 823 includes eight axial channels 823 disposed about the center axis A spaced equidistantly from one another to allow the working fluid to flow from the compression chamber 12 to the base valve 7.

A base valve 7 is disposed in the pocket of the body 821 in the rebound chamber 11 and attached to the internal cylindrical surface 8211 of the fixing member 82, adjacent to the closed end of the external tube 2. The base valve 7 defines a plurality of conduits disposed in fluid connection between the compression chamber 12 and the compensation chamber 13. The base valve 7 includes a second compression valve 72, having a plurality of discs with each of the discs having a circular shape, disposed adjacent to the body 821 and covering the conduits for limiting the flow of the working fluid to the compensation chamber 13 during the compression stroke to provide additional damping force during the compression stroke. The base valve 7 further includes a second rebound valve 71, having a plurality of discs with each of the discs having a generally circular shape, and disposed adjacent to the closed end of the external tube 2 covering the conduits for limiting the flow of the working fluid to the compensation chamber 13 during the rebound stroke to provide additional damping force during the rebound stroke.

The hydraulic compression stop arrangement 8 also includes an insert 81, as best shown in FIGS. 3*a* and 3*b*, having a generally cylindrical shape and made from a plastic material, e.g. integrally formed polyamide, disposed on the center axis A in the compression chamber 12. The insert 81, made from a plastic material, serves as a tunable component of the hydraulic compression stop arrangement 8. The fixing member 82, made from a metallic material, holds the insert 81 and provides strong reinforcement for the insert 81 because all the pressure acting on the insert 81 can be transferred to the fixing member 82 with the fixing member 82 being more durable than the insert 81.

Figure 6:
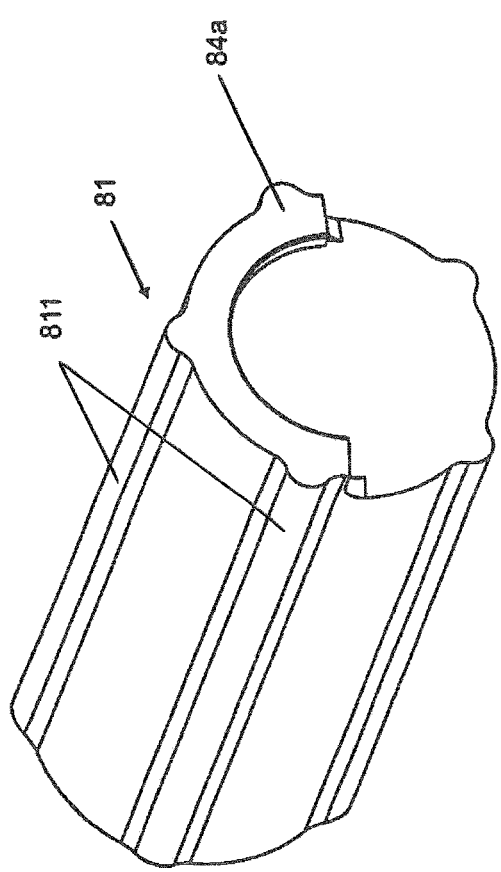
FIG. 6 is a bottom perspective view of the inert of the hydraulic compression stop arrangement.

The insert 81 includes a bottom and an inner vessel 813. The bottom, having a generally circular shape, is disposed in the compression chamber 12 adjacent to the body 821. The inner vessel 813, having a generally tubular shaped, includes a cylindrical section 8132 disposed on the center axis A and extending annularly outwardly from the bottom. The inner vessel 813 defines a cavity, opening toward the piston rod guide 6, disposed in communication with the compression chamber. The cylindrical section 8132 tapers toward a primary end to define a conical section 8131. The inner vessel 813, having an exterior surface, extends annularly about the center axis A. Referring to FIGS. 4 and 6, the exterior surface includes at least one rib 811 extending radially outwardly from the exterior surface between the bottom and the conical section 8131. Preferably, the exterior surface includes five ribs 811, spaced equidistantly apart from one another, to define a slot 812 extending between each of the rib 811 for allowing the working fluid to flow from the compression chamber 12 to the compensation chamber 13. The inner vessel 813 also has an interior surface defining at least one groove 814 extending from the conical section 8131 toward the bottom parallel to the center axis A. Preferably, the interior surface includes six grooves 814, each having a conical shape, and extends from the conical section 8131 toward the bottom parallel to the center axis A for restricting the working liquid flow into the insert 81.

The hydraulic compression stop arrangement 8 further includes an additional piston 83, as best shown in FIG. 3*b*, having a generally cylindrical shape, disposed about the threaded projection 511 for movement with the piston rod 5 during the compression stroke and the rebound stroke and engaging the insert 81 during the compression stroke to provide additional damping force during the compression stroke. The additional piston 83 including a seat 831 having a T-shape in cross-section disposed on the center axis A and extending annularly about the threaded projection 511. A sealing ring 832 is disposed adjacent to the seat 831 and extends annularly about the center axis A and for engaging the insert 81 during the compression stroke to provide additional damping force during the compression stroke. A nut 833 having a torque application hexagonal surface 8331 is disposed adjacent to the sealing ring 832 and in threaded engagement with the threaded projection 511 of the piston rod extender 51 for securing the seat 831 and the sealing ring 832 to the piston rod extender 51.

The insert 81 of the hydraulic compression stop arrangement 8 is attached to the fixing member 82 through a locking connection and spaced from the main tube 3 to allow the working fluid to flow between the insert 81 through the fixing member 82 and the base valve 7 to the compensation chamber 13. More specifically, the bottom of the insert 81 is attached to the fixing member 82 through the locking connection. The locking connection is defined by the fixing member 82 including a locking plate 85*a*, 85*b* and the bottom of the insert 81 including a locking yoke 84*a*, 84*b* with the locking yoke 84*a*, 84*b* being secured to the locking plate 85*a*, 85*b*.

As best shown in FIGS. 3*a* and 3*b*, the fixing member 82 includes a head 822, having a cylindrical shape, extending outwardly from the body 821 along the center axis A to a proximate end. The locking plate 85*a*, 85*b*, having a generally circular shape, is disposed at the proximate end of the head 822 and extending radially outwardly from the proximate end perpendicular to the center axis A, spaced from the body 821 of the fixing member 82, defining a recess extending annularly about the center axis A. The locking yoke 84*a*, 84*b*, having a generally arcuate shape and an L-shaped cross section, extends axially outwardly from the bottom of the insert 81 to engage the recess and form the locking connection. The locking plate 85*a*, 85*b* defines at least one radial slot 8221 extending through the locking plate 85*a*, 85*b* and spaced from the axial channel 823 of the body 821 and in communication with the axial channel 823 to allow the working fluid to flow through the fixing member 82.

Figure 7:
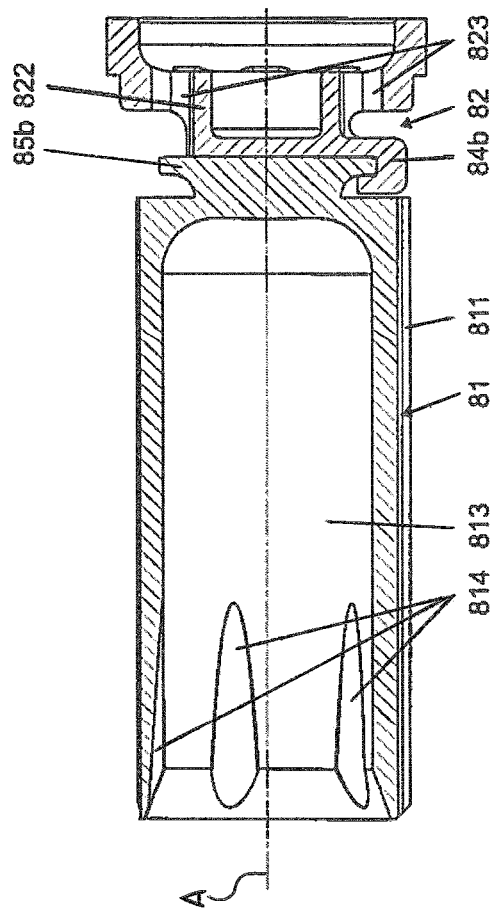
FIG. 7 is a cross-sectional view of the insert and the fixing member of an alternative embodiment of the hydraulic compressions top arrangement.

In an alternative embodiment of the present invention, as best shown in FIG. 7, the bottom of the insert 81 includes a locking plate 85*a*, 85*b* and the fixing member 82 includes a locking yoke 84*a*, 84*b* with the locking yoke 84*a*, 84*b* being secured to the locking plate 85*a*, 85*b* defining the locking connection. The bottom of the insert 81 includes a head 822, having a generally cylindrical shape, extending outwardly from the bottom along the center axis A to a proximate end. The locking plate 85*a*, 85*b*, having a generally circular shape, is disposed at the proximate end of the head 822 and extends radially outwardly from the proximate end perpendicular to the center axis A and spaced from the bottom of the insert 81 defining a recess extending annularly about the center axis A. The locking yoke 84a, 84b, having an arcuate shape and an L-shaped cross-section, and extends axially outwardly from the fixing member 82 to engage the recess and form the locking connection.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic damper comprising:
a main tube disposed on a center axis extending between a first end and a second end defining a fluid chamber extending along said center axis for containing a working fluid;
a main piston slidably disposed in said fluid chamber and movable along said center axis dividing said fluid chamber into a compression chamber between said first end and said main piston and a rebound chamber between said second end and said main piston;
a piston rod guide disposed in said rebound chamber and attached to said main tube to close said rebound chamber;
a piston rod extending along said center axis through said piston rod guide and attached to said main piston for moving said main piston between a compression stroke with said main piston moving toward said first end and a rebound stroke with said main piston moving toward said second end and said piston rod guide;
a piston rod extender disposed in said compression chamber and attached to said piston rod and extending along said center axis;
a hydraulic compression stop arrangement disposed in said compression chamber attached to said first end for providing additional damping force for the hydraulic damper during said compression stroke;
said hydraulic compression stop arrangement including a fixing member having a body attached to said first end of said main tube;
said hydraulic compression stop arrangement further including an insert disposed in said compression chamber and spaced from said main tube with said insert having a bottom and an inner vessel including a cylindrical section disposed on said center axis and extending outwardly from said bottom to define a cavity in communication with said compression chamber;
said hydraulic compression stop arrangement further including an additional piston attached to said piston rod extender for movement with said piston rod during said compression stroke and rebound stroke; and
said bottom being attached to said fixing member through a locking connection to prevent axial movement of said insert and transfer pressure exerted on said insert to said fixing member and allow said cavity of said insert to receive said additional piston during said compression stroke to provide the additional damping force during said compression stroke;
wherein said body includes a locking plate and said bottom includes a locking yoke with said locking yoke being secured to said locking plate to define said locking connection;
wherein said fixing member includes a head extending outwardly from said body along said center axis to a proximate end and said locking plate being disposed at said proximate end and extending radially outwardly from said proximate end, spaced from said body, defining a recess extending about said center axis;
wherein said locking yoke has an arcuate shape and an L-shaped cross section and extending axially outwardly from said bottom of said insert to engage said recess forming said locking connection.

2. The hydraulic damper as set forth in claim 1 wherein said locking plate defines at least one radial slot extending through said locking plate and spaced from said axial channel of said body and in communication with said axial channel to allow the working fluid to flow through said fixing member.

3. The hydraulic damper as set forth in claim 1 wherein said insert is made of polymeric material and said fixing member is made of metal.

4. The hydraulic damper as set forth in claim 1 wherein the hydraulic damper further comprises:
an external tube disposed spaced from said main tube and extending about said main tube between a closed end adjacent to said first end and an opened end adjacent said second end defining a compensation chamber between said main tube and said external tube;
a cap disposed at said first end and said closed end and attached to said closed end to close said fluid chamber and said compensation chamber;
wherein said fixing member defines at least one axial channel extending through said body and in communication with said compression chamber and said compensation chamber.

5. The hydraulic damper as set forth in claim 4 wherein said locking plate defines at least one radial slot extending through said locking plate and spaced from said axial channel of said body and in communication with said axial channel to allow the working fluid to flow through said fixing member.

6. The hydraulic damper as set forth in claim 4 wherein said at least one axial channel includes eight axial channels disposed about said center axis and spaced equidistantly from one another to allow the working liquid to flow from said compression chamber to a base valve.

7. The hydraulic damper as set forth in claim 4 wherein said insert is made of polymeric material and said fixing member is made of metal.

8. The hydraulic damper as set forth in claim 7 further including a base valve disposed between said hydraulic compression stop arrangement and said cap and attached to said fixing member of said hydraulic compression stop arrangement for limiting the flow of the working fluid to said compensation chamber during said compression stroke and said rebound stroke to provide additional damping force during said compression stroke.

9. A hydraulic damper comprising:
a main tube disposed on a center axis extending between a first end and a second end defining a fluid chamber extending along said center axis for containing a working fluid;
a main piston slidably disposed in said fluid chamber and movable along said center axis dividing said fluid chamber into a compression chamber between said first end and said main piston and a rebound chamber between said second end and said main piston;

a piston rod guide disposed in said rebound chamber and attached to said main tube to close said rebound chamber;

a piston rod extending along said center axis through said piston rod guide and attached to said main piston for moving said main piston between a compression stroke with said main piston moving toward said first end and a rebound stroke with said main piston moving toward said second end and said piston rod guide;

a piston rod extender disposed in said compression chamber and attached to said piston rod and extending along said center axis;

a hydraulic compression stop arrangement disposed in said compression chamber attached to said first end for providing additional damping force for the hydraulic damper during said compression stroke;

said hydraulic compression stop arrangement including a fixing member having a body attached to said first end of said main tube;

said hydraulic compression stop arrangement further including an insert disposed in said compression chamber and spaced from said main tube with said insert having a bottom and an inner vessel including a cylindrical section disposed on said center axis and extending outwardly from said bottom to define a cavity in communication with said compression chamber;

said hydraulic compression stop arrangement further including an additional piston attached to said piston rod extender for movement with said piston rod during said compression stroke and rebound stroke; and said bottom being attached to said fixing member through a locking connection to prevent axial movement of said insert and transfer pressure exerted on said insert to said fixing member and allow said cavity of said insert to receive said additional piston during said compression stroke to provide the additional damping force during said compression stroke;

wherein said bottom of said insert includes a locking plate and said fixing member includes a locking yoke with said locking yoke being secured to said locking plate defining said locking connection.

10. The hydraulic damper as set forth in claim 9 wherein said bottom of said insert includes a head extending outwardly from said bottom along said center axis to a proximate end and said locking plate being disposed at said proximate end and extending radially outwardly from said proximate end perpendicular to said center axis and spaced from said bottom of said insert defining a recess extending about said center axis.

11. The hydraulic damper as set forth in claim 10 wherein said locking yoke has an arcuate shape and an L-shaped cross section and extending axially outwardly from said fixing member to engage said recess forming said locking connection.

12. A hydraulic damper comprising:
a main tube disposed on a center axis extending between a first end and a second end defining a fluid chamber extending along said center axis for containing a working fluid;

an external tube disposed spaced from said main tube and extending about said main tube between a closed end adjacent to said first end and an opened end adjacent said second end defining a compensation chamber between said main tube and said external tube;

a cap disposed at said first end and said closed end and attached to said closed end to close said fluid chamber and said compensation chamber;

a main piston slidably disposed in said fluid chamber and movable along said center axis dividing said fluid chamber into a compression chamber between said first end and said main piston and a rebound chamber between said second end and said main piston;

a piston rod guide disposed in said rebound chamber and attached to said main tube to close said rebound chamber;

a piston rod extending along said center axis through said piston rod guide and attached to said main piston for moving said main piston between a compression stroke with said main piston moving toward said first end and a rebound stroke with said main piston moving toward said second end and said piston rod guide;

a piston rod extender disposed in said compression chamber and attached to said piston rod and extending along said center axis; and a hydraulic compression stop arrangement disposed in said compression chamber attached to said first end for providing additional damping force for the hydraulic damper during said compression stroke;

said hydraulic compression stop arrangement including a fixing member having a body attached to said first end of said main tube and defining at least one axial channel extending through said body and in communication with said compression chamber and said compensation chamber;

said hydraulic compression stop arrangement further including an insert disposed in said compression chamber and spaced from said main tube with said insert having a bottom and an inner vessel including a cylindrical section disposed on said center axis and extending outwardly from said bottom to define a cavity in communication with said compression chamber;

said hydraulic compression stop arrangement further including an additional piston attached to said piston rod extender for movement with said piston rod during said compression stroke and rebound stroke;

said bottom of said insert being attached to said fixing member through a locking connection to prevent axial movement of said insert and transfer pressure exerted on said insert to said fixing member and allow said cavity of said insert to receive said additional piston during said compression stroke to provide the additional damping force during said compression stroke;

wherein said bottom of said insert includes a locking plate and said fixing member includes a locking yoke with said locking yoke being secured to said locking plate defining said locking connection.

13. The hydraulic damper as set forth in claim 12 wherein said bottom of said insert includes a head extending outwardly from said bottom along said center axis to a proximate end and said locking plate being disposed at said proximate end and extending radially outwardly from said proximate end perpendicular to said center axis and spaced from said bottom of said insert defining a recess extending about said center axis.

14. The hydraulic damper set forth in claim 13 wherein said locking yoke has an arcuate shape and an L-shaped cross section and extending axially outwardly from said fixing member to engage said recess forming said locking connection.

* * * * *